United States Patent [19]

Dazzi

[11] Patent Number: 4,467,757

[45] Date of Patent: Aug. 28, 1984

[54] INJECTOR SYSTEM FOR AN INTERNAL COMBUSTION ENGINE

[75] Inventor: Jean-Louis Dazzi, Bellevue, France

[73] Assignee: Renault Vehicules Industriels, Rhone, France

[21] Appl. No.: 361,014

[22] Filed: Mar. 23, 1982

[30] Foreign Application Priority Data

Mar. 26, 1981 [FR] France ............................. 81 06572

[51] Int. Cl.³ .................................... F02B 77/08
[52] U.S. Cl. ...................... 123/198 DB; 123/198 D; 123/446; 239/533.3; 239/126
[58] Field of Search ............ 123/198 D, 198 DB, 446; 239/124, 125, 126, 533.1–533.12

[56] References Cited

U.S. PATENT DOCUMENTS

| | | | |
|---|---|---|---|
| 2,053,311 | 9/1936 | Amery | 239/126 |
| 2,067,997 | 1/1937 | White | 123/198 DB |
| 2,912,168 | 11/1959 | L'Orange | 239/125 |
| 2,934,138 | 4/1960 | Warne | 239/126 |
| 3,016,838 | 1/1962 | Bessiere | 123/198 DB |
| 3,104,817 | 9/1963 | Vander Fee et al. | 239/533.5 |
| 3,645,245 | 2/1972 | Hammond et al. | 123/198 DB |
| 4,134,549 | 1/1979 | Perr | 239/533.4 |
| 4,369,750 | 1/1983 | Muntean et al. | 123/198 DB |

Primary Examiner—Ira S. Lazarus
Attorney, Agent, or Firm—Remy J. VanOphem

[57] ABSTRACT

A means to cut off the feeding of combustible fluid under pressure to an injector needle of a diesel engine which is stuck in the open position.

The end portion of a push rod which insures the closing of the injector needle under the push of a spring includes a throat which it slides across an orifice of a predetermined cross-sectional area of value S. The orifice is in communication with a chamber wherein is mounted a differential piston. The chamber also is connected to a discharge passage by a calibrated orifice whose cross-section S is directly related to the cross-section of the orifice. At the end of each injection stroke, the throat terminates communication with the orifice of cross-section S and the pressure in the chamber is reduced before the piston is displaced. If the needle of the injector sticks in the open position, then the throat remains in communication with the orifice and the pressure in the chamber continues to increase sufficiently to overcome a preloaded spring to move the piston in the chamber which in turn is adapted to block the feeding canal 20 of the combustible fluid distribution system thereby insuring closing of the injector needle.

19 Claims, 5 Drawing Figures

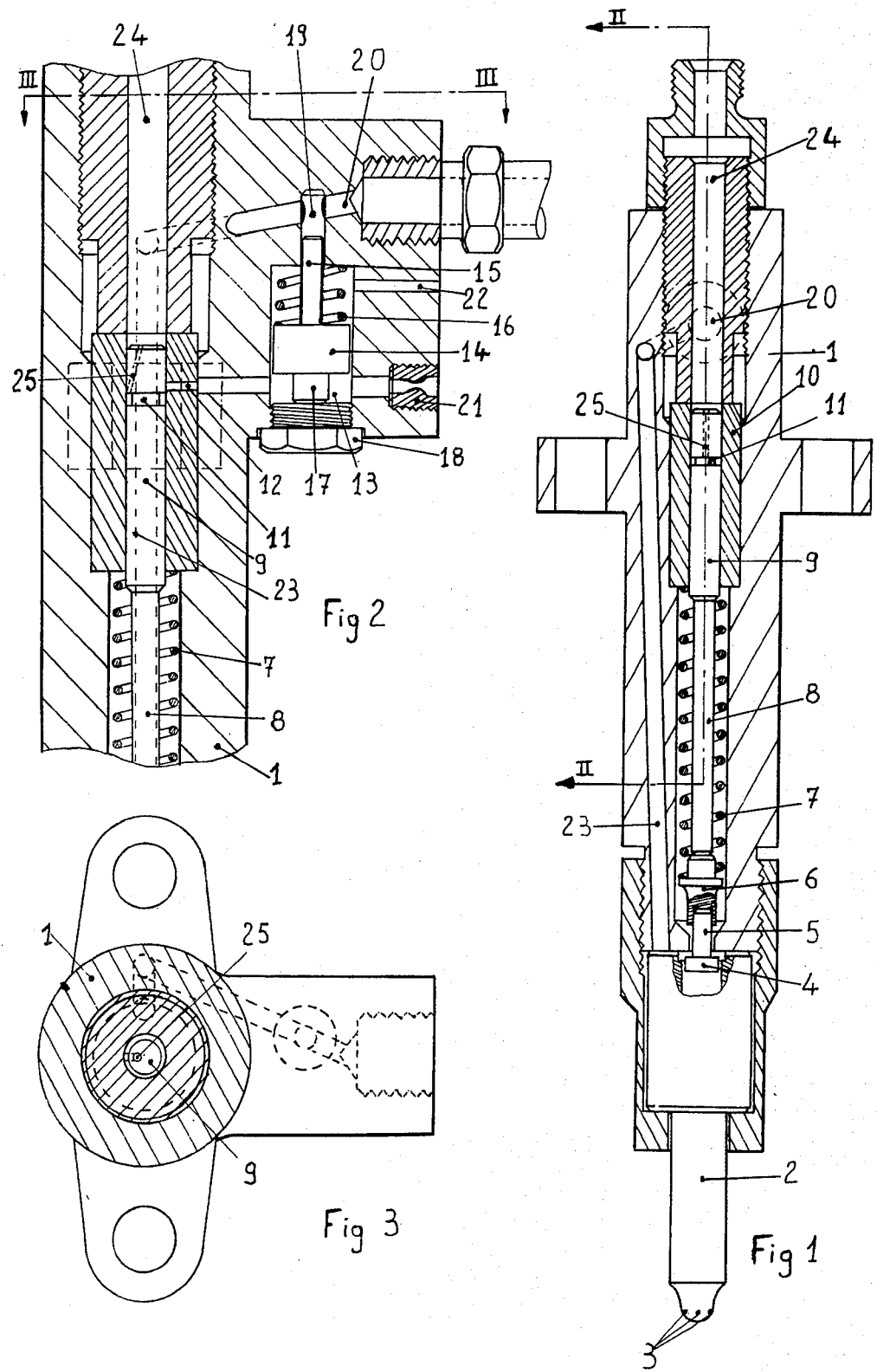

INJECTOR SYSTEM FOR AN INTERNAL COMBUSTION ENGINE

BACKGROUND OF THE INVENTION

The present invention is related to an injection system adapted to be used with internal combustion engines. Specifically, the injection system measures out a combustible liquid (notably a hydrocarbide) before sending it to the injector under pressure.

In diesel engines, as well as in gasoline engines of the type with direct injection, each combustion chamber is equipped with an injector provided with an injector needle which lifts itself from a seat at the start of each injection and closes itself upon its seat as soon as the injection is terminated.

Most of the time, the injector needle is subjected to a spring applied pressure which tends to push it back upon its seat, that is, to return to its closed position. With each cycle of the injection pump, complemented or not by a distributor, the combustible liquid is introduced to the injector and the pressure wave causes the unseating of the injector needle. As soon as the pressure is reduced at the end of the injection, a spring closes the needle, and it closes it effectively most of the time. On the other hand, it can happen that the needle has the tendency to hang-up in the body of the injector so that the force of the spring becomes insufficient to effect the closing of the needle. When this occurs, communication is maintained between the body of the injector-carrier and the combustion chamber, which results in the stalling of the engine. This inconvenience is particularly grave in the case of an injection system fed by constant pressure, because then the open injector continuously furnishes the combustible fluid.

The present invention aims at avoiding this inconvenience by providing a positive system which automatically cuts off the feeding of the combustible fluid to the injector which has become stuck in an open position.

SUMMARY OF THE INVENTION

A security device according to the invention, concerns an injector for an internal combustion engine provided with an injector needle normally activated between an opening position and a closing position through a rise and fall movement, at the beginning and end of each injection cycle respectively, while feeder passages feed the injector with a combustible liquid at a predetermined feeding pressure. The invention is characterized by the fact that a distributor receives a combustible fluid and feeds it, under pressure, to an injector by the use of an injector needle which is integral with a distributor having a throat portion which moves in front of a fixed orifice of the injector-carrier or body. The throat communicates with a chamber equipped with an obturating piston which admits the combustible fluid to the injector by means of the distributor capabilities when the injector needle is in the open position. The piston chamber is equipped with a sliding differential piston which, when the pressure in the chamber reaches a predetermined threshold, causes the piston to overcome a preload spring force in order to block the general feed passages to the injector, thereby insuring closing of the injector needle upon its seat. Normal operation of the engine is unobstructed by pressure sensing means which avoid blocking of the feeding passage if the injector needle closes properly.

In this way, as soon as the injector needle is lifted, combustible liquid under pressure is communicated to a pressure chamber of the piston. If this admission does not last beyond a predetermined duration, as defined by the pressure sensing means, the force of the pressure in the chamber of the blocking piston does not exceed the preload of the compression spring and the piston remains immobile. Under this condition, the injection is accomplished normally and ceases as soon as the needle seats itself. Of course, the threshold of duration defined by the pressure sensing means is selected for a time period greater than the duration of the longest time period greater than the duration of the longest injections anticipated for the system so as not to interfere with the normal injection process in any fashion.

If, on the other hand, the injector needle tends to remain stuck in the open position, the period of time during which the combustible liquid under pressure is admitted into the chamber of the blocking piston is lengthened. When this duration goes beyond the threshold defined by the pressure sensing means, the pressure behind the blocking piston becomes sufficient to move the piston, overcoming the preload spring force and blocking the feed passage of the stuck injector. This cut-off is maintained for as long as the injector needle remains stuck in the open position. In this way, any grave deterioration of the performance of the engine is avoided.

According to another characteristic of the invention, we anticipate a pressure control means adapted to establish a feeding of combustible fluid independent of the feeding which insures the normal injection of the combustible fluid.

According to another characteristic of the invention, the pressure control means consists of a calibrated orifice fitted to the chamber of the blocking piston in order to link it to the circuit of discharge of the combustible fluid. The chamber of this blocking piston is then fed through an orifice of cross-sectional area S which communicates with the distributing passages while at the same time communicating the second orifice of cross-section s with a discharge passage. There is only need to calculate the relative values of the cross-sections S and of cross-section of the discharge orifice s in order to define the pressure which is established behind the blocking piston in case of permanent flow, which is to say when the injector needle is stuck in the open position.

BRIEF DESCRIPTION OF THE DRAWINGS

The drawing attached, given by way of non-limiting example, offers a better understanding of the invention and the advantages which it provides.

FIG. 1 is a partial front cross-section view of a diesel engine injector equipped according to the invention;

FIG. 2 is a partial view along lines II/II of FIG. 1;

FIG. 3 is a view along lines III/III of FIG. 2;

DETAILED DESCRIPTION OF THE PREFERRED EMBODIMENT

Figure 4:
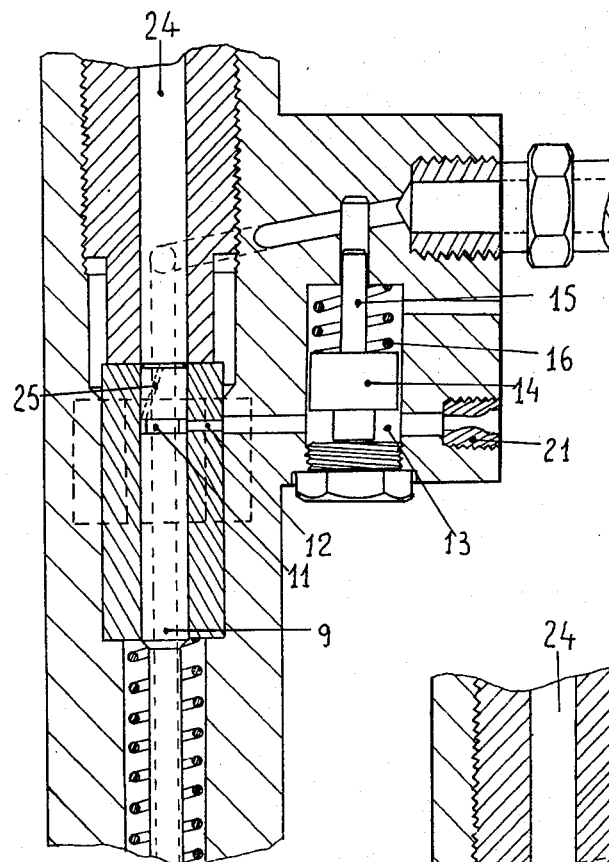
FIG. 4 is a partial section view similar to FIG. 2, showing the position of the injector components during a normal injection.

With reference to FIGS. 1 through 5, there is respresented an assembly of the injector and of an injector-carrier for diesel engines, equipped with a device according to the invention.

Inside the injector-carrier assembly 1 is found, as is known, an injector 2 whose extremity includes orifices of injection 3.

Behind these orifices 3 a watertight seal is found, (not shown) on which the extremity of an injector needle 4 comes to rest in the manner well known in the art. The tail 5 of the injector needle 4 is adapted to receive a ferrule 6 behind which is a return spring 7. The ferrule 6 is part of a push rod 8 which, according to the invention, has a rear cylinder part or puller-slide 9 which is adapted to act as a hydraulic distributor.

While the engine is running, the needle 4 is raised by the push rod 8 from its seat with each injection resulting in the puller-slide distributor 9, to move an alternating sliding movement within the body 10 of the fixed distributor. The amount of play or tolerance between the puller-slide 9 and the body 10 corresponds to current manufacturing tolerances for injection systems, for the assurance of a satisfactory seal of the combustible liquid contained in the body 10 when it is under an ordinary amount of pressure.

The puller-slide distributor 9 includes a throat 11 which is capable of being moved across a fixed orifice 12 or a passage having a cross-sectional area of value S. This orifice 12 is located in the body 10 and communication with a cylindrical chamber 13 in the body 10 in which is located a differential piston having a large diameter portion 14 and a small diameter portion 15 which slides in fluid sealing fashion within the chamber 13 around the periphery of the large diameter portion 14. The piston portions 14 and 15 selectively reciprocate within the cylindrical chamber 13 as a result of the difference in force between a preloaded return spring 16 interposed the large diameter portion 14 and the body 10 and a force generated by the pressurized combustible fluid admitted through the orifice 12.

When pressure is low or nil in the cylindrical chamber 13, the piston occupies the position at rest illustrated in FIG. 2. A rear stop portion or abutment 17 extends from the piston and rests against the closed end of the chamber 13, represented by a plug 18 threaded into an internally threaded opening at the end of the chamber 13 in the drawing.

Figure 5:
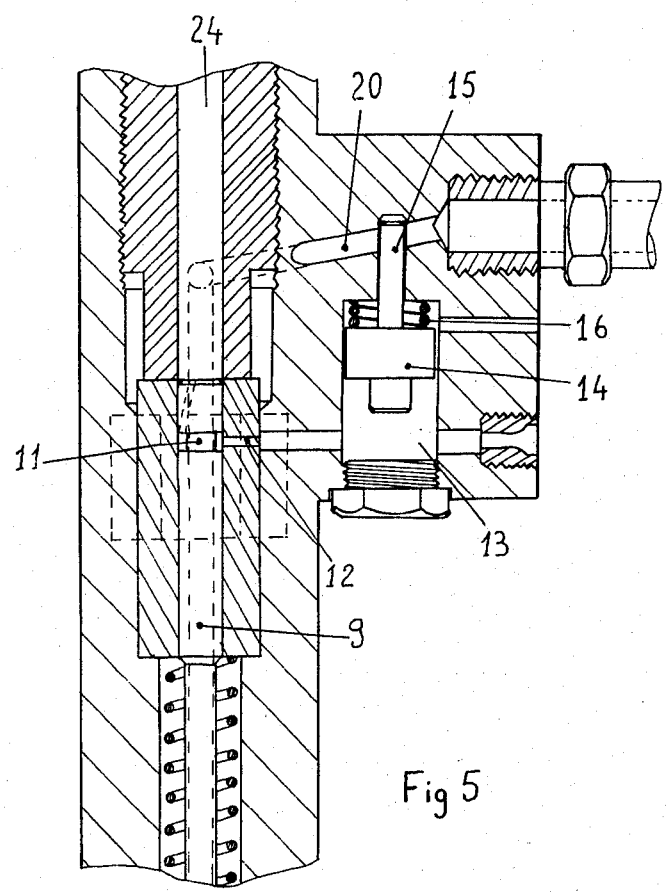
FIG. 5 is a view similar to FIGS. 2 and 4, showing the position of the injector components in case of a blocked injector, that is, injector needle being stuck in open position.

On the end of the piston opposite the abutment 17, the small diameter portion 15 slides in a fluid sealing fashion in a fixed cylindrical bore 19. A feed canal 20 intersects the cylindrical bore 19. The small diameter portion 15 blocks the cylindrical bore 19 completely when the differential piston is in a raised portion, as illustrated in FIG. 5.

A tubular member 21, with a calibrated cross-sectional area of s, is also interconnected with the portion of the chamber 13 interconnected with the orifice 12, with a discharge passage (not shown) which returns the combustible fluid back to the reservoir.

Also, the portion of the chamber 13 in which the preloaded return spring 16 is mounted communicates through a discharge orifice 22, with a discharge passage (not shown) which returns the combustible fluid to the reservoir.

The feed canal 20 receives, in the known manner, the principal flow of combustible liquid coming from the high pressure pump of the injection circuit.

The feed canal 20 communicates in the usual manner such as by passage 23 provided in the body of the injector-carrier assembly 1, with the injection chamber (not shown) which is behind the fluid seal seat, at the extremity of the injector needle 4, in order to inject the combustible fluid via the engine via the orifices 3, as soon as the needle 4 is raised off its seat.

Furthermore, the rear section of the injector-carrier assembly 1 includes an axial passage 24 which receives the combustible fluid sent under modulated pressure, as is well known in the art, from a hydraulic distributor. We will recall that, of the known prior art systems, when the combustible fluid located in the axial passage 24 is under high pressure, its force on the end section of the puller-slide distributor 9 is strong and maintains the needle 4 in closed position against the force of the combustible fluid at the orifice 12 and in the feed canal passage 20 and 23, respectively.

On the contrary, when the pressure in the axial passage 24 falls below the pressure in the feed canal 20 and passage 23 the needle 4 lifts from its seat, thus provoking the start of the injection through the orifices 3.

According to the invention there is provided at the rear of the puller-slide distributor 9, a passage 25 which puts the throat 11 in communication with the axial passage 24.

The relationship of the calibrated orifice 12 (having a cross-sectional area of S) and the tubular member 21 (having a cross-sectional area of s) constitutes a means of controlling the timing, for the operation of which we give to S a value larger than s.

The operation of the invention is as follows:

In a rest position, which is to say between two injections, the apparatus is in the position illustrated in FIGS. 1 and 2. The throat 11 of the puller-slide distributor 9 is shifted out of registry with the orifice 12. Consequently, the pressure which dominates in the axial passage 24 does not reach the chamber 13 of the differential piston. The chamber 13 is maintained at discharge pressure by its communications with the discharge passage through the tubular member 21. The differential piston is subjected only to the force of the preloaded return spring 16, and its stop portion or abutment 17 rests against a surface of the plug 18. Under these conditions, the feed canal 20 is not blocked and the combustible fluid under high pressure (around 1000 bars, for example) is fed permanently through the passage system. The passage system remains ready to cause the raising of the needle 4 and to initiate an injection operation as soon as the pressure in the axial passage 24 is caused voluntarily to fall.

During a normal injection cycle, which is to say following a decrease in the pressure of the combustible fluid in the axial passage 24, the needle 4 is lifted from its fluid tight seat and the assembly occupies the position illustrated in FIG. 4. The throat 11 of the distributor puller-slide 9 comes into communication with the calibrated orifice 12, communicating combustible fluid under high pressure from the axial passage 24, through the intermediary passage 25 to the orifice 12.

The pressure in the chamber 13 increases due to the fact that the cross-sectional area S of the feeder orifice, or calibrated orifice 12 is larger than the cross-sectional area s of the escape orifice in the tubular member 21. The rate at which the pressure in the chamber 13 increases can be predetermined by the initial choice of the relative values of the cross-sectional areas S and s. The respective values of S and s are chosen in such a way that the rise in pressure in the chamber 13 which acts on the differential piston is sufficiently slow so as not to become domineering in relation to the force of the preloaded return spring 16, during a period of time which is at least equal to longest possible duration of an injection under the various possible conditions of the functioning of the engine.

Under these conditions, it is understood that the differential piston remains constantly immovable, that is in the position illustrated in FIG. 4, as long as the needle 4 of the injector functions normally. In fact, at the beginning of the injection, the needle 4 is lifted, its throat 11 comes into communication with the orifice 12, and pressure increases sufficiently to overcome the force of the preloaded return spring 16 and displace the piston to block the feed canal 20, the injection is completed and the needle 4 has fallen back upon its seat. The throat 11 at this point returns to the position in FIG. 2, which cuts off the communication of the orifice 12 with the throat 11 and the pressure in the chamber 13 decreases due to the communication of the orifice 21 with the discharge orifice 22, its pressure decreases and the differential piston remains immobile.

The operation of the invention in the event of a failure of the return spring 7 or a similar failure is shown in FIG. 5. In effect, the needle 4, having been lifted during an injection (which brings the throat 11 into communication with the orifice 12), and failing to properly close for whatever reason, thereby allows combustible fluid to be communicated to its injector 2. Under this condition, the return spring 7 is incapable of making the needle fall back upon its seat and the puller-slide distributor 9 remains immobilized in the position illustrated in FIG. 5. Under this condition, as has already been explained, pressure mounts in the chamber 13 and since the communication of the pressure in the throat 11 to the orifice 12 remains established indefinitely, the pressure in the chamber 13 reaches a value which exceeds the preload threshold level of the calibration of the preloaded return spring 16. As soon as the pressure surpasses this threshold level, its force becomes dominant and the differential piston compresses the preloaded return spring 16 against the bottom surface of the chamber 13 to the position illustrated in FIG. 5. In this case, the stem of the small diameter portion 15 of the differential piston completely blocks the feed canal 20 which interrupts the feeding of the injector 2. Consequently, as long as the needle 4 remains open, the feeding of combustible fluid through the feed canal 20 and passage 23 ceases. The injector needle 4, which on a classical engine would remain open indefinitely, is thereby positively closed by blocking the feed canal to interrupt the supply of combustible liquid through the passage 23 and orifices 3 into the engine.

Having thus described the present invention by means of a detailed description of the preferred embodiment, what is claimed as novel is as follows:

1. A fluid injector comprising:
   an injector main body;
   an injection cavity in said injector main body;
   a fluid supply passage having one end interconnected with said injection cavity and having another end interconnectable with a fluid supply means continuously supplying pressurized fluid thereto;
   at least one aperture in said injector main body opening into said injection cavity;
   selectively movable primary valve means interposed said injection cavity and said at least one aperture and movable between an open position and a closed position;
   first biasing means continuously biasing said selectively movable primary valve means in said closed position;
   second biasing means selectively actuable to bias said selectively movable primary valve means in said open position, said second biasing means being interconnectable with means for intermittently activating said second biasing means; and
   selectively operable deactivating means for said second biasing means, said deactivating means being automatically operable to deactivate said second biasing means when said selectively movable primary valve means remains continuously open for a period of time in excess of a predetermined period of time.

2. The fluid injector of claim 1 wherein said second biasing means comprises said pressurized fluid in said injection cavity acting against said selectively movable primary valve means and wherein said selectively operable deactivating means comprises:
   secondary valve means disposed along said fluid supply passage selectively operable to disconnect said fluid supply means from said injection cavity; and
   valve actuation means for said secondary valve means automatically operable to close said secondary valve means when said selectively movable primary valve means remains continuously open for a period of time in excess of said predetermined period of time.

3. The fluid injector of claim 1 wherein said injection cavity comprises a first and a second chamber interconnected by an intermediate passageway, said fluid supply passage interconnected with said first chamber, and said at least one aperture is open into said first chamber.

4. The fluid injector of claim 3 wherein said second biasing means comprises:
   a differential piston movably and sealingly disposed in said intermediate passageway; and
   a second fluid supply passage having one end interconnected with said second chamber and a second end interconnectable with a fluid supply means intermittently supplying pressurized fluid thereto.

5. A fluid injector comprising:
   an injector main body;
   a primary cavity in said injector main body, said primary cavity having a first chamber, a second chamber, and an intermediate passageway extending between said first chamber and said second chamber;
   a first fluid supply passage having one end interconnected with said first chamber of said primary cavity and another end interconnected with a first fluid supply means continuously supplying pressurized fluid thereto;
   a second fluid supply passage having one end interconnected with said second chamber of said primary cavity and another end interconnected with a second fluid supply means intermittently supplying pressurized fluid thereto;
   at least one aperture in said injector main body opening into said first chamber;

selectively movable primary valve means interposed said first chamber and said at least one aperture and movable between an open position and a closed position;

first biasing means continuously biasing said selectively movable primary valve means in said closed position;

a primary differential piston having a first end interconnected with said selectively movable primary valve means and having a second end disposed opposite said first end and sealingly inserted into said intermediate passageway so as to form a seal between said first chamber and said second chamber, said primary differential piston having a first portion facing said first chamber and a second portion facing said second chamber such that said primary differential piston is selectively reciprocable in said primary cavity against the force of said first biasing means to open and close said selectively movable primary valve means in response to the difference in pressure between said first chamber and said second chamber;

a secondary valve means disposed along said first fluid supply passage selectively operable to disconnect said first fluid supply means from said first chamber of said primary cavity; and secondary valve actuation means for said secondary valve means automatically operable to close said secondary valve means when said selectively movable primary valve means remains continuously open for a period of time in excess of a predetermined period of time.

6. The fluid injector of claim 5 wherein said secondary valve actuation means comprises:

a second cavity in said injector main body;

a secondary differential piston movably disposed in said secondary cavity and forming a seal between said secondary differential piston and said injector main body to divide said secondary cavity into a third chamber and a fourth chamber;

passage means between said second chamber of said primary cavity and said third chamber of said secondary cavity;

first throat means along said passage means restricting the flow of fluid therealong, said first throat means having a first predetermined cross-sectional area;

tertiary valve means along said passage means operable in response to the reciprocal position of said primary differential piston to permit flow of fluid therethrough only when said primary differential piston is in a position opening said selectively movable primary valve means;

vent passage means interconnected with said third chamber of said secondary cavity for venting away pressurized fluid therefrom;

second throat means along said vent passage means restricting the flow of fluid therealong, said second throat means having a second predetermined cross-sectional area, said second predetermined cross-sectional area being smaller than said first predetermined cross-sectional area; and second biasing means biasing said secondary differential piston towards said third chamber thereof and exerting a predetermined force thereagainst such that, when said primary differential piston is reciprocated to a position opening said selectively movable primary valve means, the pressure level in said third chamber of said secondary cavity increases until, after said predetermined period of time, said pressure level overcomes said predetermined force of said second biasing means and moves said secondary differential piston to close said secondary valve means.

7. The fluid injector of claim 6 wherein said injector main body further comprises an elongated passageway having one end open into said fourth chamber of said secondary cavity and having a portion crossing said first fluid supply passage and further wherein said secondary valve means further comprises an elongated chamber extending from said secondary differential piston and movably and sealingly inserted in said elongated passageway such that said elongated chamber is selectively drawn across said first fluid supply passage in response to a predetermined increase in pressure in said third chamber.

8. The fluid injector of claim 7 wherein said passage means between said second chamber of said primary cavity and said third chamber of said secondary cavity comprises:

a first passageway in said injector main body having one port open to said intermediate passageway and an other port open to said third chamber of said secondary cavity; and a secondary passageway within said primary differential piston having one port open to said second chamber and having an other port selectively registerable with said other port of said first passageway when said primary differential piston is reciprocated to said position wherein said selectively movable primary valve means is open.

9. The fluid injector of claim 8 wherein said primary differential piston is interconnected with said selectively movable primary valve means by means of an elongated member and wherein said first biasing means comprises a coil spring interposed said injector main body and said selectively movable primary valve means and wound around said elongated member.

10. The fluid injector of claim 6 wherein said passage means between said second chamber of said primary cavity and said third chamber of said secondary cavity comprises a first passageway in said injector main body having one port open to said intermediate passageway and another port open to said third chamber of said secondary cavity and a secondary passageway within said primary differential piston having one port open to said second chamber and having another port selectively registerable with said another port of said first passageway when said primary differential piston is reciprocated to said position wherein said selectively movable primary valve means is open.

11. The fluid injector of claim 10 wherein said primary differential piston is interconnected with said selectively movable primary valve means by means of an elongated member and wherein said first biasing means comprises a coil spring interposed said injector main body and said selectively movable primary valve means and wound around said elongated member.

12. The fluid injector of claim 5 wherein said primary differential piston is interconnected with said selectively movable primary valve means by means of an elongated member and wherein said first biasing means comprises a coil spring interposed said injector main body and said selectively movable primary valve means and wound around said elongated member.

13. The fluid injector of claim 12 wherein said secondary valve actuation means comprises:
a second cavity in said injector main body;
a secondary differential piston movably disposed in said secondary cavity and forming a seal between said secondary differential piston and said injector main body to divide said secondary cavity into a third chamber and a fourth chamber;
passage means between said second chamber of said primary cavity and said third chamber of said secondary cavity;
first throat means along said passage means restricting the flow of fluid therealong, said first throat means having a first predetermined cross-sectional area;
tertiary valve means along said passage means operable in response to the reciprocal position of said primary differential piston to permit flow of fluid therethrough only when said primary differential piston is in a position opening said selectively movable primary valve means;
vent passage means interconnected with said third chamber of said secondary cavity for venting away pressurized fluid therefrom;
second throat means along said vent passage means restricting the flow of fluid therealong, said second throat means having a second predetermined cross-sectional area, said second predetermined cross-sectional area being smaller than said first predetermined cross-sectional area; and
second biasing means biasing said secondary differential piston towards said third chamber thereof and exerting a predetermined force thereagainst such that, when said primary differential piston is reciprocated to a position opening said selectively movable primary valve means, the pressure level in said third chamber of said secondary cavity increases until, after said predetermined period of time, said pressure level overcomes said predetermined force of said second biasing means and moves said secondary differential piston to close said secondary valve means.

14. A fuel injector for injecting fuel into an engine, said fuel injector further comprising:
an injector main body;
a primary cavity in said injector main body, said primary cavity having a first chamber, a second chamber, and an intermediate passageway extending between said first chamber and said second chamber;
a first fuel supply passage having one end interconnected with said first chamber of said primary cavity and another end interconnected with a first fuel supply means continuously supplying pressurized fluid thereto;
a second fluid supply passage having one end interconnected with said second chamber of said primary cavity and another end interconnected with a second fuel supply means intermittently supplying pressurized fuel thereto;
at least one aperture in said injector main body opening into said first chamber;
selectively movable primary valve means interposed said first chamber and said at least one aperture and movable between an open position and a closed position;
first biasing means continuously biasing said selectively movable primary valve means in said closed position;
a primary differential piston having a first end interconnected with said selectively movable primary valve means and having a second end disposed opposite said first end and sealingly inserted into said intermediate passageway so as to form a seal between said first chamber and said second chamber, said primary differential piston having a first portion facing said first chamber and a second portion facing said second chamber such that said primary differential piston is selectively reciprocable in said primary cavity against the force of said first biasing means to open and close said selectively movable primary valve means in response to the difference in pressure between said first chamber and said second chamber;
a secondary valve means disposed along said first fuel supply passage selectively operable to disconnect said first fuel supply means from said first chamber of said primary cavity;
a second cavity in said injector main body;
a secondary differential piston movably disposed in said secondary cavity and forming a seal between said secondary differential piston and said injector main body to divide said secondary cavity into a third chamber and a fourth chamber;
passage means between said second chamber of said primary cavity and said third chamber of said secondary cavity;
first throat means along said passage means restricting the flow of fuel therealong, said first throat means having a first predetermined cross-sectional area;
tertiary valve means along said passage means operable in response to the reciprocal position of said primary differential piston to permit flow of fuel therethrough only when said primary differential piston is in a position opening said selectively movable primary valve means;
vent passage means interconnected with said third chamber of said secondary cavity for venting away pressurized fuel therefrom;
second throat means along said vent passage means restricting the flow of fuel therealong, said second throat means having a second predetermined cross-sectional area, said second predetermined cross-sectional area being smaller than said first predetermined cross-sectional area; and
second biasing means biasing said secondary differential piston towards said third chamber thereof and exerting a predetermined force thereagainst such that, when said primary differential piston is reciprocated to a position opening said selectively movable primary valve means, the pressure level in said third chamber of said secondary cavity increases until, after said predetermined period of time, said pressure level overcomes said predetermined force of said second biasing means and moves said secondary differential piston to close said secondary valve means.

15. The fuel injector of claim 14 wherein said injector main body further comprises an elongated passageway having one end open into said fourth chamber of said secondary cavity and having a portion crossing said first fuel supply passage and further wherein said secondary valve means further comprises an elongated member extending from said secondary differential piston and movably and sealingly inserted in said elongated passageway such that said elongated member is selectively drawn across said first fuel supply passage in response to a predetermined increase in pressure in third chamber.

16. The fuel injector of claim 14 wherein said primary differential piston is interconnected with said selectively movable primary valve means by means of an elongated member and wherein said first biasing means comprises a coil spring interposed said injector main body and said selectively movable primary valve means and wound around said elongated member.

17. The fuel injector of claim 16 wherein said injector main body further comprises an elongated passageway having one end open into said fourth chamber of said secondary cavity and having a portion crossing said first fuel supply passage and further wherein said secondary valve means further comprises an elongated member extending from said secondary differential piston and movably and sealingly inserted in said elongated passageway such that said elongated member is selectively drawn across said first fuel supply passage in response to a predetermined increase in pressure in said third chamber.

18. The fuel injector of claim 16 wherein said passage means between said second chamber of said primary cavity and said third chamber of said secondary cavity comprises:
- a first passageway in said injector main body having one port open to said intermediate passageway and an other port open to said third chamber of said secondary cavity; and
- a secondary passageway within said primary differential piston having one port open to said second chamber and having an other port selectively registerable with said other port of said first passageway when said primary differential piston is reciprocated to said position wherein said selectively movable primary valve means is open.

19. The fuel injector of claim 14 wherein said passage means between said second chamber of said primary cavity and said third chamber of said secondary cavity comprises:
- a first passageway in said injector main body having one port open to said intermediate passageway and an other port open to said third chamber of said secondary cavity; and
- a secondary passageway within said primary differential piston having one port open to said second chamber and having an other port selectively registerable with said other port of said first passageway when said primary differential piston is reciprocated to said position wherein said selectively movable primary valve means is open.

* * * * *

UNITED STATES PATENT AND TRADEMARK OFFICE
CERTIFICATE OF CORRECTION

PATENT NO. : 4,467,757
DATED : August 28, 1984
INVENTOR(S) : Jean Louis Dazzi

It is certified that error appears in the above-identified patent and that said Letters Patent is hereby corrected as shown below:

Column 3, line 56, delete "portion" and insert ---- position ----.

Signed and Sealed this

Sixteenth Day of April 1985

[SEAL]

Attest:

DONALD J. QUIGG

Attesting Officer    Acting Commissioner of Patents and Trademarks